United States Patent
Reed et al.

(10) Patent No.: US 8,103,619 B1
(45) Date of Patent: Jan. 24, 2012

(54) COMPRESSING DATA STORED IN A DATABASE SYSTEM

(75) Inventors: Michael L. Reed, San Diego, CA (US); Kevin D. Virgil, Oceanside, CA (US)

(73) Assignee: Teradata US, Inc., Dayton, OH (US)

( * ) Notice: Subject to any disclaimer, the term of this patent is extended or adjusted under 35 U.S.C. 154(b) by 2762 days.

(21) Appl. No.: 10/002,795

(22) Filed: Nov. 15, 2001

(51) Int. Cl.
    *G06F 17/30* (2006.01)
(52) U.S. Cl. ..................... 707/609; 707/705
(58) Field of Classification Search ............ 707/1–10, 707/100–104.1, 200–205, 609, 705
    See application file for complete search history.

(56) References Cited

U.S. PATENT DOCUMENTS

| | | | |
|---|---|---|---|
| 5,640,584 A | | 6/1997 | Kandasamy et al. |
| 5,649,196 A | * | 7/1997 | Woodhill et al. ............ 707/204 |
| 5,781,773 A | * | 7/1998 | Vanderpool et al. .......... 707/100 |
| 5,864,842 A | | 1/1999 | Pederson et al. |
| 5,872,904 A | | 2/1999 | McMillen et al. |
| 5,884,299 A | | 3/1999 | Ramesh et al. |
| 6,192,370 B1 | * | 2/2001 | Primsch .................... 707/103 R |
| 6,434,558 B1 | * | 8/2002 | MacLeod et al. ................. 707/6 |

FOREIGN PATENT DOCUMENTS

JP    09270919 A  *  10/1997

OTHER PUBLICATIONS

Peter Gulutzan&Trudy Pelzer, "SQL-99 Complete, Really," pp. 30-33, 517-539 (1999).

\* cited by examiner

*Primary Examiner* — Shahid Alam
(74) *Attorney, Agent, or Firm* — Trop, Pruner & Hu P.C.

(57) ABSTRACT

In a database system, compression user-defined data types (UDTs) are defined to enable compression of data. Each compression UDT is associated with one or more UDT methods to compress data according to one or more respective compression algorithms. Also, one or more data structures are associated with data stored according to each compression UDT to store values pertaining to the compression of the data.

26 Claims, 4 Drawing Sheets

COMPRESSING DATA STORED IN A DATABASE SYSTEM

BACKGROUND

A database is a collection of stored data that is logically related and that is accessible by one or more users or applications. A popular type of database is the relational database management system, which includes relational tables made up of rows and columns. Each row represents an occurrence of an entity defined by a table, with an entity being a person, place, or thing about which the table contains information.

To extract data from, or to update, a relational table, queries according to a standard database query language are used (e.g., Structured Query Language or SQL). One version of SQL is the SQL-92 Standard, while another version of SQL is the SQL-99 Standard (also referred to as the SQL-3 Standard).

SQL-99 defines several data types, including predefined data types and user-defined data types (UDTs). Examples of predefined data types include the number data type for representing numeric values, character string data type for representing a sequence of characters, and so forth. A characteristic of predefined SQL data types is that the inherent structure of the data type is already defined by the SQL Standard. User-defined data types, on the other hand, are not predefined; instead, user-defined data types are set by an application, a database management system, or by another standard.

With the advent of user-defined data types, more complex data objects can be stored in relational tables. Examples of complex objects include video data, image data, audio data, formatted documents, multimedia data, and so forth. Database systems that are capable of storing complex objects in relational tables are referred to as object relational database management systems (ORDBMS). In an ORDBMS, the user-defined data type enables the storage of large objects as an entry in the relational table.

In many modern database applications, large amounts of data are typically stored. For example, in some data warehousing applications, vast amounts of data are stored. Conventionally, data compression is applied to reduce data storage requirements. One compression technique applies compression on entire data blocks. A data block is a predefined block of storage for storing one or more rows of a table. The compression of entire data blocks is considered a brute force compression technique that may not be efficient in all circumstances. Another compression technique is applied on certain data values, such as null values and most frequently used values. However, this latter compression technique is available for certain data values, but may not be available for other data values stored in tables.

SUMMARY

In general, an improved compression method and apparatus is provided for data stored in a database system. For example, a process for use in a database system includes storing data according to a user-defined data type in a table, and associating at least a first compression routine with the user-defined data type. The first compression routine is used to compress the data according to the user defined data type.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
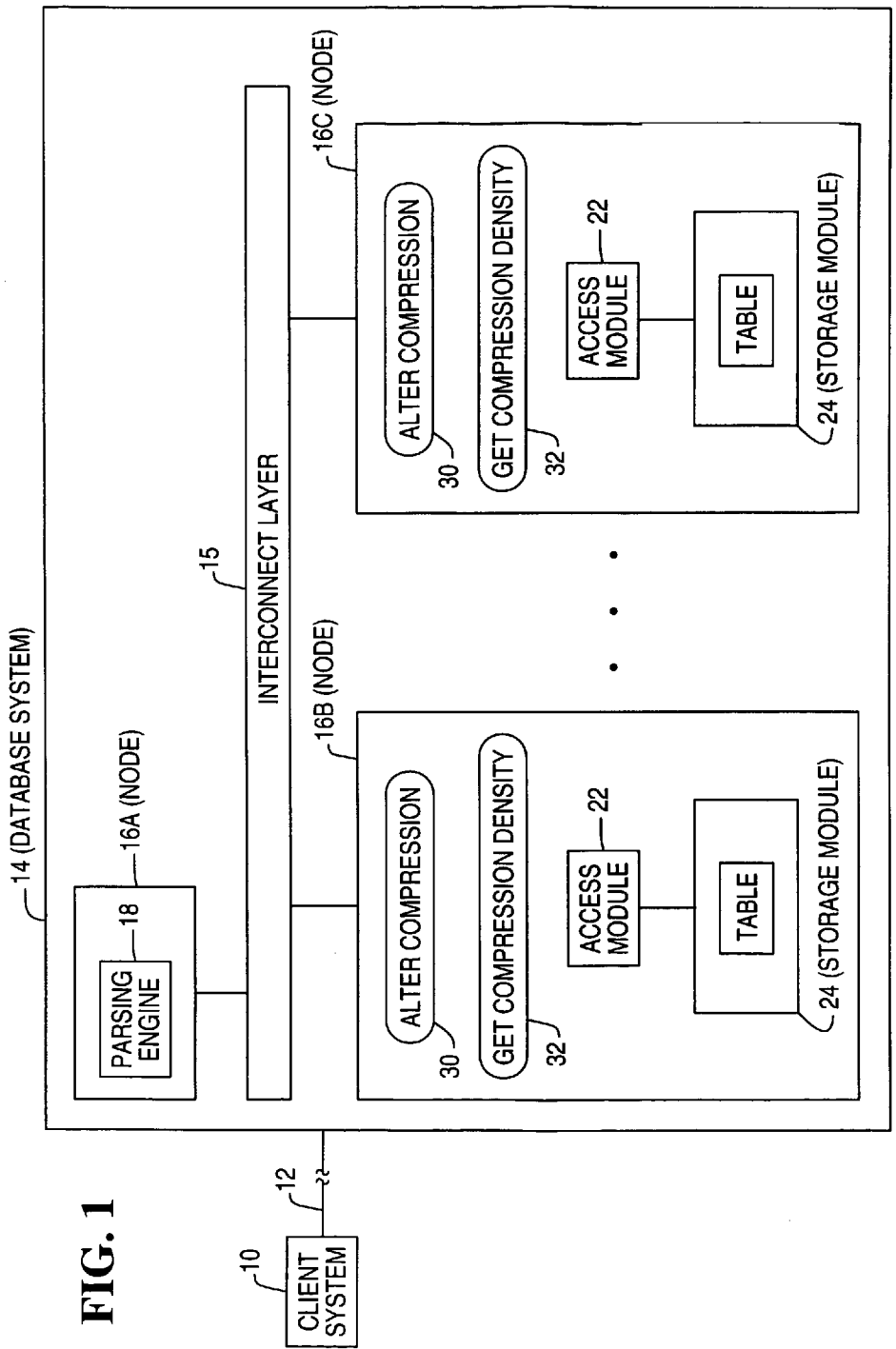
FIG. 1 is a block diagram of an example arrangement of a client system and a database system.

FIG. 1 shows a client system 10 coupled to a database system 14 over a data network 12. Examples of the data network 12 include a local area network (LAN), a wide area network (WAN), the Internet, and so forth. The client system 10 is capable of issuing queries according to a standard database query language to the database system 14 to access or update data or to create or alter data structures (e.g., tables, rows, and so forth) in the database system 14. One type of a standard database query language is the Structured Query Language (SQL). SQL is provided by the American National Standards Institute (ANSI), with one version being the SQL-99 Standard (also referred to as the SQL-3 Standard). Although reference is made to SQL-99 in this discussion, other embodiments can employ other types of standard database query languages that provide for user-defined data types (UDTs).

As used here, a "UDT" refers to a data type used in the database system that can be created by a user, an application, a database management system, or another standard (other than the database query language standard). UDTs are contrasted with predefined or built-in data types, which have structures already defined by the standard database query language itself.

SQL provides for data definition language (DDL) statements that are used to define database structures. SQL also provides for data manipulation language (DML) statements that are used to manipulate fields of a table. Examples of DML statements include SELECT, UPDATE, DELETE, and INSERT statements. Examples of DDL statements include statements to create or modify tables or views. In addition, in accordance with SQL-99, DDL statements include a CREATE TYPE statement to create a UDT, and a CREATE METHOD statement to create a method associated with a UDT. All such statements can be generated by the client system 10 and communicated over the data network 12 for processing by the database system 14.

In accordance with some embodiments of the invention, one or more UDTs are defined to enable compression of data stored in the database system 14. One example UDT is referred to as CompressUDT. The CompressUDT is associated with defined data structures as well as with one or more UDT methods. In this case, the UDT methods include compression methods to apply compression on data stored according to the CompressUDT. A method is a routine that is invoked to perform a task with respect to data defined by the UDT.

In one embodiment, a UDT is implemented as a C++ class, which includes data and methods. Typically, such methods are not visible to an SQL user (e.g., a software application). In other embodiments, a UDT can be implemented by some other mechanism.

According to one arrangement, the database system 14 includes a plurality of nodes 16A, 16B, and 16C that are coupled together by an interconnect layer 15. The node 16A is coupled to the network 12, and in the illustrated embodiment, includes a parsing engine or query coordinator 18. The parsing engine 18 interprets a query (such as a query received from the client system 10), checks the query for proper SQL syntax, and sends out executable actions to be performed by the nodes 16B, 16C.

Each of the nodes 16B, 16C includes an access module 22. One example of an access module 22 is the access module processor (AMP) used in some TERADATA® database systems from NCR Corporation. Each access module 22 is responsible for managing access to a respective portion of the database. As shown in FIG. 1, each access module 22 manages access to data stored in a respective storage module 24. Although shown as discrete components, the storage module 24 may be part of the same storage subsystem, with the storage modules 24 representing different partitions of the storage subsystem.

Each storage module 24 stores one or more tables. Because the database system 14 shown in FIG. 1 is a parallel database system that enables concurrent access of different portions of a table, the tables are distributed among plural storage modules 24, as shown in FIG. 1. Each table is thus said to be distributed across multiple access modules, with data in the respective portions of the table accessed by corresponding access modules.

In a different embodiment, instead of having multiple nodes, the parallel database system is implemented as a single-node, multiprocessing system that has plural processors. In yet another embodiment, a uni-processor database system is used.

Figure 2:
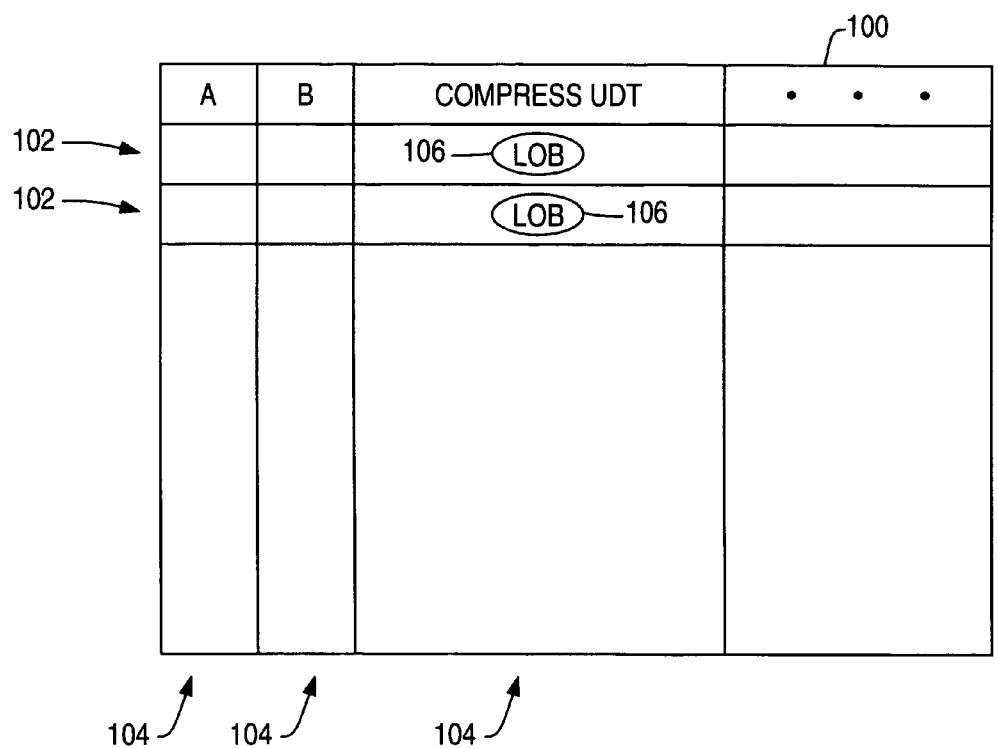
FIG. 2 illustrates an example table stored in the database system of FIG. 1.

FIG. 2 shows an example table 100 that is stored in the database system 14 of FIG. 1. The table 100 includes plural rows (or tuples) 102, as well as columns (or attributes) 104. In the example of FIG. 2, attributes A and B are according to predefined data types, such as integers, characters, and so forth. However, the table 100 also includes an attribute according to a UDT, referred to as the CompressUDT.

CompressUDT is capable of storing large objects 106, such as video data, image data, multimedia data, formatted documents, and so forth. According to one embodiment, CompressUDT maintains the following data structures for each data object stored in the table according to CompressUDT: Kind (integer), which indicates the type of compression algorithm used to compress the data object; and PCTCompressed (floating type), which contains a value indicating the percentage of compression of the data object (a higher value indicates that the data object is more compressed). As used here, a "data object" refers generally to data stored in an entry of a relational table.

The Kind and PCTCompressed data structures are maintained for each data object that is of type CompressUDT in the relational table. When a CompressUDT data object is accessed, the Kind value is used by the CompressUDT to determine what compression algorithm to use to uncompress data. In some cases, user-defined methods (UDMS) can be invoked to retrieve the PCTCompressed value to determine how efficiently the data object is compressed (as explained further below). The PCTCompressed value can be used by an SQL user to determine whether a given data object can benefit from further compression, such as by use of another compression algorithm.

In addition to the Kind and PCTCompressed data structures, CompressUDT is also associated with one or more built-in UDT compression methods. Plural built-in compression methods associated with CompressUDT are used to implement respective plural compression algorithms. When storing a data object into a CompressUDT attribute of a table, one of the CompressUDT compression methods is invoked to compress the data. The plural CompressUDT methods are ordered according to some index to identify the order in which the compression methods are to be called to improve the compression of a data object. One of the built-in CompressUDT methods is marked as the default method to use for compressing data. The built-in CompressUDT methods are also used to uncompress data objects as they are being retrieved (with the Kind data structure used to specify which method to invoke).

According to one embodiment, in addition to the built-in compression methods, the following user-defined methods (UDMs) are also defined: an AlterCompression( ) method 30, and a GetCompressionDensity( ) method 32 (see FIG. 1). In one example, a user-defined method is a C++ function that is visible to an SQL user (e.g., a software application). A C++ function can be called directly by an SQL user. A user-defined method is contrasted to a built-in UDT method, which cannot be invoked directly by an SQL user.

In alternative embodiments, the compression methods for implementing respective compression algorithms can also be user-defined methods. For example, CompressUDT can be associated with some built-in compression methods as well as with one or more user-defined methods to implement further compression algorithm(s). In another arrangement, all compression methods can be implemented as user-defined methods. Also, the AlterCompression( ) method 30 and GetCompressionDensity( ) method 32 discussed above can be implemented as built-in UDT methods instead of user-defined methods.

Thus, generally, a "method" can refer to either a built-in UDT method or a user-defined method.

In one example, the syntax of the AlterCompression( ) method 30 is as follows: AlterCompression(CompressionList array [ ] of integer). The AlterCompression( ) method 30 is invoked to improve data compression using one or more compression algorithms specified in the CompressionList array. The listed one or more compressing algorithms are built-in compression methods associated with CompressUDT. The AlterCompression( ) method 30 returns the newly compressed object.

The GetCompressionDensity( ) method 32 returns the PCTCompressed value which represents how much an accessed CompressUDT data object has been compressed (as a percentage).

In one example, the following SQL statement can be used to re-compress objects stored in a table (Album):
UPDATE Album
SET Picture=Picture.AlterCompression(CompressionList)
WHERE Picture.GetCompressionDensity( )<75.

In the example above, the table Album includes a CompressUDT attribute Picture for storing image objects. The statement returns the percentage compression of each Picture object. For those Picture objects that have a compression density of less than 75%, the AlterCompression( ) method 30 is called to recompress objects in the Picture attribute using one or more specified compression algorithms in CompressionList.

Figure 3:
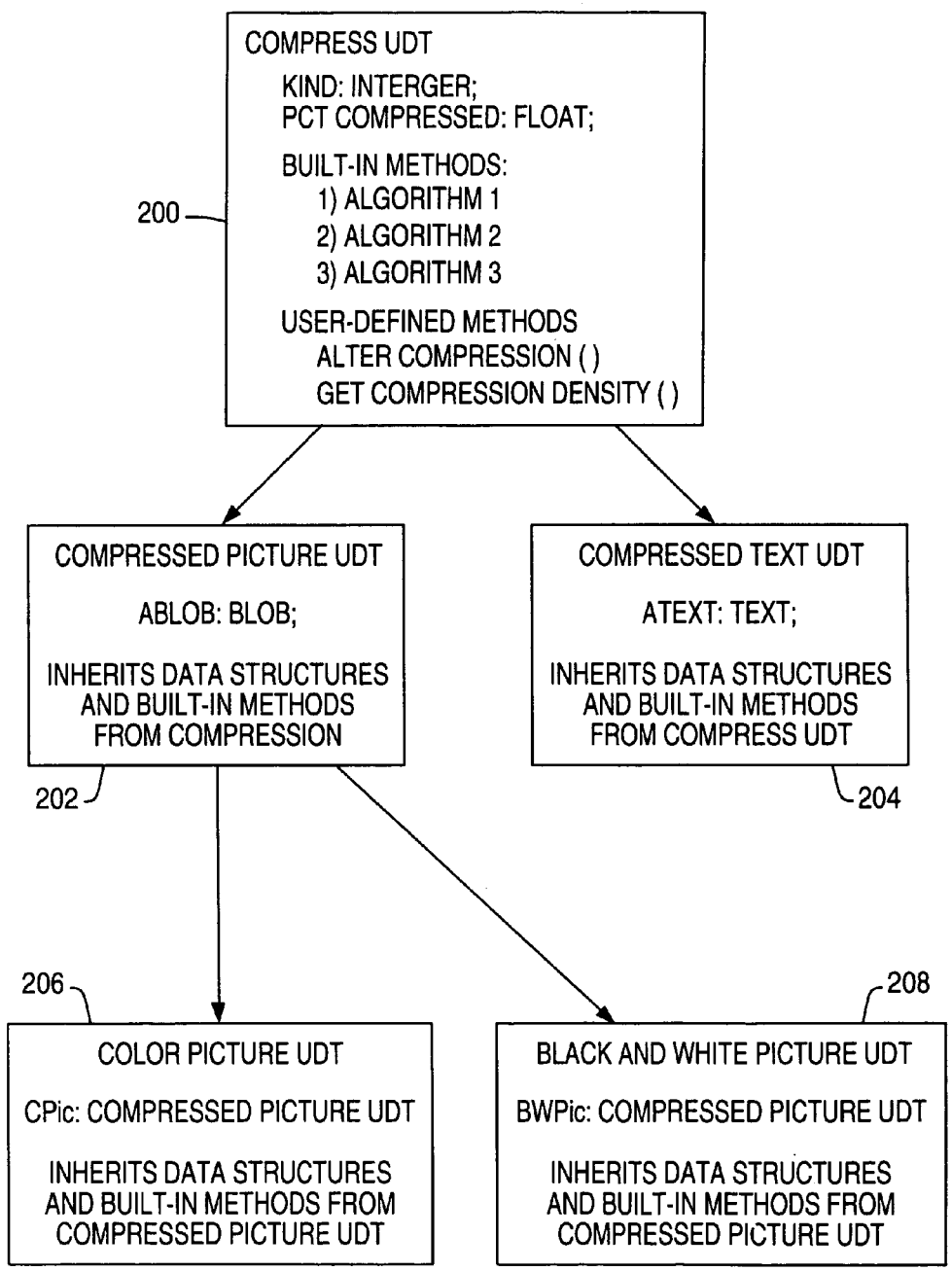
FIG. 3 illustrates a hierarchy of various user-defined data types that enable compression of data.

The structure of CompressUDT is shown in a box 200 in FIG. 3. CompressUDT includes the Kind and PCTCompressed data structures. Also associated with CompressUDT are the built-in UDT compression methods (three illustrated in the example) as well as the user-defined methods AlterCompression( ) and GetCompressionDensity( ).

The database system can also include other UDTs that are built upon CompressUDT. By building the other UDTs upon CompressUDT, properties of the base UDT (CompressUDT) can be inherited. The following are some examples of other UDTs that can be defined in the database system 14: CompressedPictureUDT (box 202), and CompressedTextUDT (box 204). The CompressedPictureUDT is used to store large image objects, which can be in the form of a binary large object (BLOB). The CompressedTextUDT is used to store text objects, such as text documents.

The Kind and PCTCompressed data structures and UDT compression methods are inherited from CompressUDT into the child UDTs. Thus, the CompressedPictureUDT and CompressedTextUDT have access to the same UDT compression methods. However, each of the CompressedPictureUDT and CompressedTextUDT may use a different default compression algorithm depending on which is the most efficient for the particular type of data. For example, a first compression algorithm may be more efficient for image objects stored according to CompressedPictureUDT, while a second compression algorithm may be more efficient for text documents stored according to CompressedTextUDT.

In addition, a ColorPictureUDT (box 206) is built upon the CompressedPictureUDT, and a BlackAndWhitePictureUDT (box 208) is also built upon the CompressedPictureUDT. The ColorPictureUDT is used to store color images, while the BlackAndWhitePictureUDT is used to store black and white images. Again, ColorPictureUDT and BlackAndWhitePictureUDT inherit the same data structures and built-in compression methods from the parent UDTs. However, the default compression method for compressing data may be different.

Figure 4:
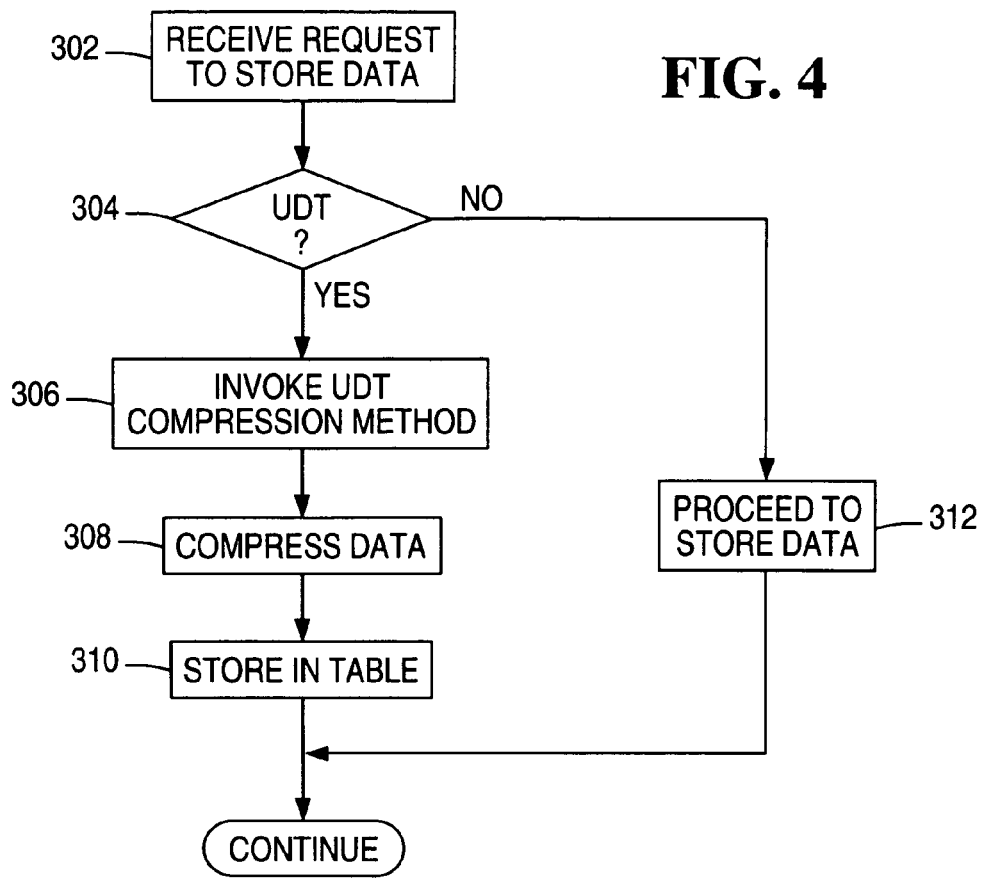
FIG. 4 is a flow diagram of a process of writing data to a relational table in a database system.

FIG. 4 shows a process of storing data according to one of the above-listed compression UDTs in a relational table. A request to store data is received (at 302) by the database management software. This can be an SQL INSERT statement, for example, to insert a row into the table. Next, the database management software determines (at 304) if the data is to be stored according to a UDT.

If the data is to be stored according to a UDT, a built-in UDT method is invoked (at 306). If the UDT is the CompressUDT, then the invoked built-in UDT method is a compression method. Note that generally, the database management software does not necessarily know whether a UDT is a compression UDT or not. If the invoked UDT method is a compression method, then the method compresses the data (at 308). The compressed data is stored in the table (at 310).

However if data is to be stored according to a data type other than a UDT, as determined at 304, then the access module 22 proceeds (at 312) to store the data without invoking a UDT method.

Figure 5:
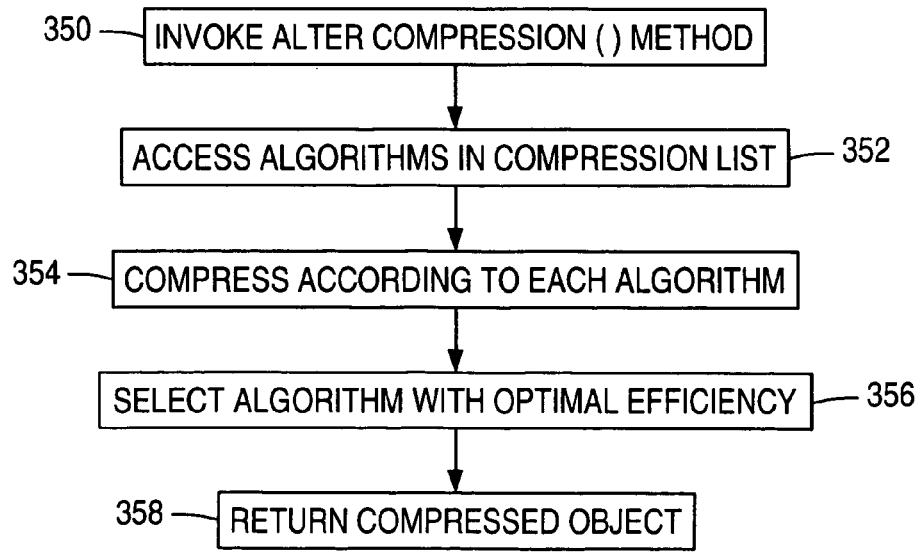
FIG. 5 is a flow diagram of a process of altering compression of data stored in a relational table.

After data has been stored into a table that contains at least one attribute according to a compression UDT, a user may wish to check if other compression algorithms can be used to enhance compression efficiency. This is accomplished by calling the AlterCompression( ) method 30. As shown in FIG. 5, in response to invocation (at 350) of the AlterCompression( ) method 30, the AlterCompression( ) method 30 accesses (at 352) the CompressionList array to determine which compression algorithms to use. The AlterCompression( ) method 30 calls (at 354) the UDT compression method corresponding to each of the listed compression algorithms to compress the data according to the corresponding compression algorithm. If multiple compression algorithms are listed, then multiple UDT compression methods are called.

If plural compression algorithms are listed, the relative efficiencies of the compression performed using the plural compression algorithms are compared (at 356) to identify the optimal algorithm. The compression percentage is also compared to the original compression percentage. The compressed object according to this algorithm is then returned (at 358) for storage into the table. In creating the compressed object, values of the Kind and PCTCompressed data structures associated with the compressed UDT object are set to reflect the type of compression algorithm used and the percentage of compression. If it is determined that the one or more compression algorithms in CompressionList did not improve the compression efficiency, then the original data object is left unchanged.

Instructions of the various software routines or modules discussed herein (such as access modules 22, UDT methods, and user-defined methods) are loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to each system in one of many different ways. For example, code segments including instructions stored on floppy disks, CD or DVD media, a hard disk, or transported through a network interface card, modem, or other interface device are loaded into the device or system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:
1. A process for use in a database system, comprising:
   storing data according to a first user-defined data type in a table;
   associating at least a first compression routine with the first user-defined data type; and
   using the first compression routine to compress the data according to the first user-defined data type.

2. The process of claim 1, further comprising using a second compression routine to compress the data to improve compression efficiency.

3. The process of claim 2, wherein using the first and second compression routines comprises using user-defined data type methods.

4. The process of claim 3, wherein using the user-defined data type methods comprises using methods built in with the first user-defined data type.

5. The process of claim 1, wherein using the first compression routine comprises using a first compression method built in with the first user-defined data type.

6. The process of claim 5, further comprising providing a user-defined method executable to invoke the first compression method.

7. The process of claim 6, further comprising invoking the user-defined method to invoke a second compression method built in with the first user-defined data type.

8. The process of claim 7, wherein invoking the user-defined method comprises invoking the user-defined method to alter compression efficiency.

9. The process of claim 1, further comprising providing a second user-defined data type built upon the first user-defined data type.

10. The process of claim 9, further comprising storing a first type of data using the first user-defined data type and storing a second type of data using the second user-defined data type.

11. The process of claim 10, further comprising using a second compression routine to compress the second type of data.

12. The process of claim 9, further comprising inheriting at least a data structure and at least a built-in method from the first user-defined data type into the second user-defined data type.

13. An article comprising at least one storage medium containing instructions that when executed cause a system to:
    store data according to a first user-defined data type in a database system; and
    associate a first compression routine with the first user-defined data type for compressing the data.

14. The article of claim 13, wherein the instructions when executed cause the system to associate a second compression routine with the first user-defined data type, the first and second compression routines providing different compression algorithms.

15. The article of claim 14, wherein the instructions when executed cause the system to provide the first compression routine as a method built in with the first user-defined data type.

16. The article of claim 15, wherein the instructions when executed cause the system to provide the second compression routine as a method built in with the first user-defined data type.

17. The article of claim 13, wherein the instructions when executed cause the system to associated a first data structure with the first user-defined data type, the first data structure to indicate a type of compression applied on a data object.

18. The article of claim 17, wherein the instructions when executed cause the system to associate a second data structure with the first user-defined data type, the second data structure to indicate a percentage amount of compression of the data object.

19. The article of claim 18, wherein the instructions when executed cause the system to access the first and second data structures of the data object when accessing the data object.

20. The article of claim 19, wherein the instructions when executed cause the system to store the data object in a relational table.

21. The article of claim 20, wherein the instructions when executed cause the system to provide a second user-defined data type built upon the first user-defined data type.

22. The article of claim 19, wherein the instructions when executed cause the system to store the data object in a relational table distributed across multiple access modules.

23. The article of claim 13, wherein the instructions when executed cause the system to provide a second user-defined data type built upon the first user-defined data type.

24. The article of claim 23, wherein the instructions when executed cause the system to inherit the first compression routine from the first user-defined data type into the second user-defined data type.

25. The article of claim 24, wherein the instructions when executed cause the system to:
    associate a second compression routine with the first user-defined data type; and
    inherit the second compression routine from the first user-defined data type into the second user-defined data type.

26. The article of claim 25, wherein the instructions when executed cause the system to:
    store a first type of data using the first user-defined data type; and
    store a second type of data using the second user-defined data type.

* * * * *